July 31, 1934.  G. TER MEER  1,968,181
CENTRIFUGAL MACHINE
Original Filed Aug. 15, 1931
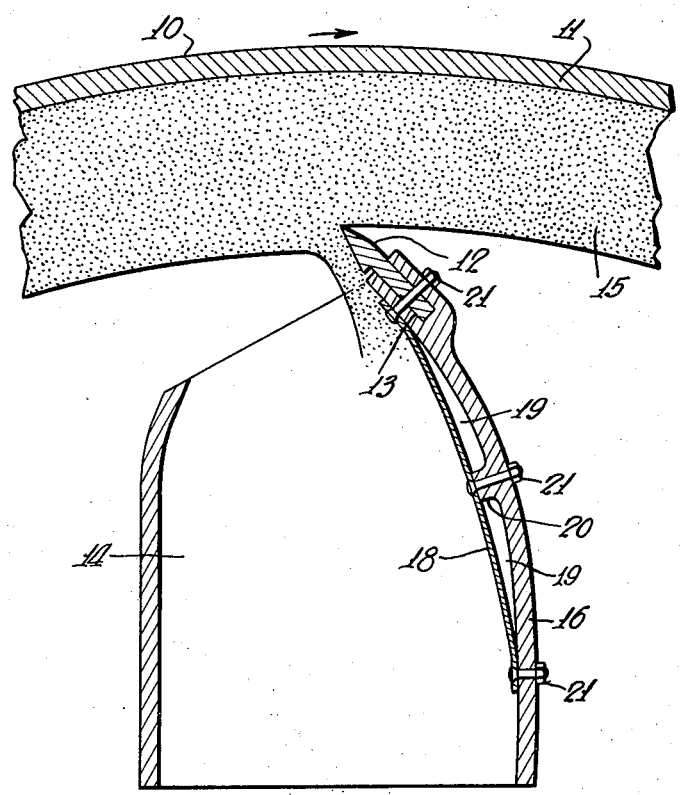
INVENTOR
*Gustav Ter Meer*
BY
ATTORNEYS Patented July 31, 1934

1,968,181

UNITED STATES PATENT OFFICE 1,968,181

CENTRIFUGAL MACHINE

Gustav ter Meer, Munich, Germany, assignor to Albert T. Otto & Sons, New York, N. Y., a corporation of New York Original application August 15, 1931, Serial No. 557,317. Divided and this application October 21, 1932, Serial No. 638,876. In Germany August 21, 1930

4 Claims. (Cl. 210—70)

The invention relates to centrifugal machines, and this application is a division of my co-pending application Serial No. 557,317, filed Aug. 15, 1931.

The invention relates particularly to centrifugal machines in which the solids accumulate on the inner surface of a wall of the separating drum during centrifugal action and are scraped off by a scraping or peeling knife, while the drum is rotating. In such machines a chute is usually provided to convey the separated solids from the region adjacent to said knife.

Since the scraper is operated while the machine is running at high speed, the separated material is thrown against a wall of the chute. This material, when scraped off, is still moist and has a tendency to bind and stick so that it will adhere to the wall of the chute, especially the wall with which it comes directly in contact after leaving the wall of the drum.

After a short period of operation, the chute will be clogged up and further passage of material through the chute will be obstructed. This necessitates the shutting down of the machine and the cleaning out of the chute, and causes a loss of power as a result of the resistance offered by the reduced flow of the material through the chute.

Furthermore, in the handling of certain crystalline material, the projection of the material against the chute walls with great force is apt to cause destruction of the crystal structure.

One object of the present invention is to provide an apparatus for preventing the discharge chute from being clogged up and to resiliently counteract the impact of the material being separated as it strikes the walls of the chute.

As an important feature of the present invention, there is provided a membrane or sheet of elastic material which is positioned on that wall of the chute against which the material strikes after being scraped from the drum. The wall of the chute is so formed, and the elastic sheet is so positioned that a space is provided between said sheet and said wall to permit vibration of said sheet when struck by the scraped material. This sheet serves to reduce the impact of the scraped material against the chute walls, and also due to its vibratory action, serves to release any material which would have the tendency to adhere thereto.

In the accompanying drawing, there is shown for the purpose of the present invention, one form embodying the present invention, the single figure being a section through the scraper, chute wall and the collecting wall of the drum.

In the specific embodiment of the present invention there is provided a separatory drum 10 rotatable in the direction indicated and having a peripheral wall 11. Disposed in the drum 10 is a knife 12 which is movable towards and from the periphery of the drum 10, and which is advantageously carried in a groove 13 at the end of a chute 14. In the specific form shown, this chute is tubular in shape, and open at the end adjacent to the knife 12.

The separated solids accumulate on the peripheral wall 11 in the form of a layer 15, and, after it has reached a sufficient thickness, may be scraped off by the knife 12. The material from the layer 15, as it is being cut by the knife 12, strikes the right hand wall of the chute 14 with great force. In order to reduce the impact, there is connected to the inside of said chute an elastic membrane or sheet 18 made of ebonite or India rubber or other analogous flexible material. In order to permit free vibration of the sheet 18, spaces are provided between the wall 16 and the membrane 18. For that purpose, the wall 16 is arch shaped, and the membrane is extended as a chord across the arch on the inside of said wall to form chambers 19. The wall may be provided on the inside thereof with bosses 20 to support the membrane 18 at spaced points. This membrane is advantageously so mounted as to permit its ready attachment or detachment, for instance, by means of bolts 21. By this arrangement, the elastic membrane 18 may be replaced when it has become worn.

Having thus described my invention, what I claim as new and desire to secure by Letters Patent is:

1. In a centrifugal machine, a rotary drum having a peripheral wall on the inside surface of which solid substances may accumulate in the form of a layer during centrifugal action, a scraper adapted to be moved into scraping relationship with said layer, a chute positioned below and serving as a support for said scraper and adapted to receive the material from said scraper, and a flexible plate covering and spaced from that portion of the chute wall which is subjected to the impact of the scraped material and extending along one side only of said chute.

2. A centrifugal machine having a chute formed of substantially inflexible material and having a scraping member rigid therewith on one side of said chute, and a flexible sheet supported by said side of the chute at its edges nearest to and farthest from said scraper, and extending in the path of travel of the material removed by said scraping member, an intermediate portion of said sheet being spaced from the chute so as to be free to vibrate.

3. In a centrifugal machine, a rotary drum having a peripheral wall on the inside surface of which solid substances may deposit in the form of a layer during centrifugal action, a chute open at one end and having a curved wall, a knife connected to and carried by the outer end of said wall, said chute and knife being adapted to be moved into scraping relationship in respect to said peripheral wall, and an elastic plate having its opposite edges connected to said curved wall and its body extending along one side of said chute in the path of travel of the material removed by said knife, a portion of said body being spaced from said curved wall to permit said plate to vibrate and liberate material tending to adhere thereto.

4. A centrifugal machine including a chute having a scraper fixed thereto on one side thereof, and a flexible wall disposed in the path of travel of the material removed by said scraper, and having its edges nearest to and farthest from said scraper secured to the same side of said chute, and having its body portion free to vibrate by the impact of the material therewith.

GUSTAV TER MEER.